Patented Mar. 1, 1927.

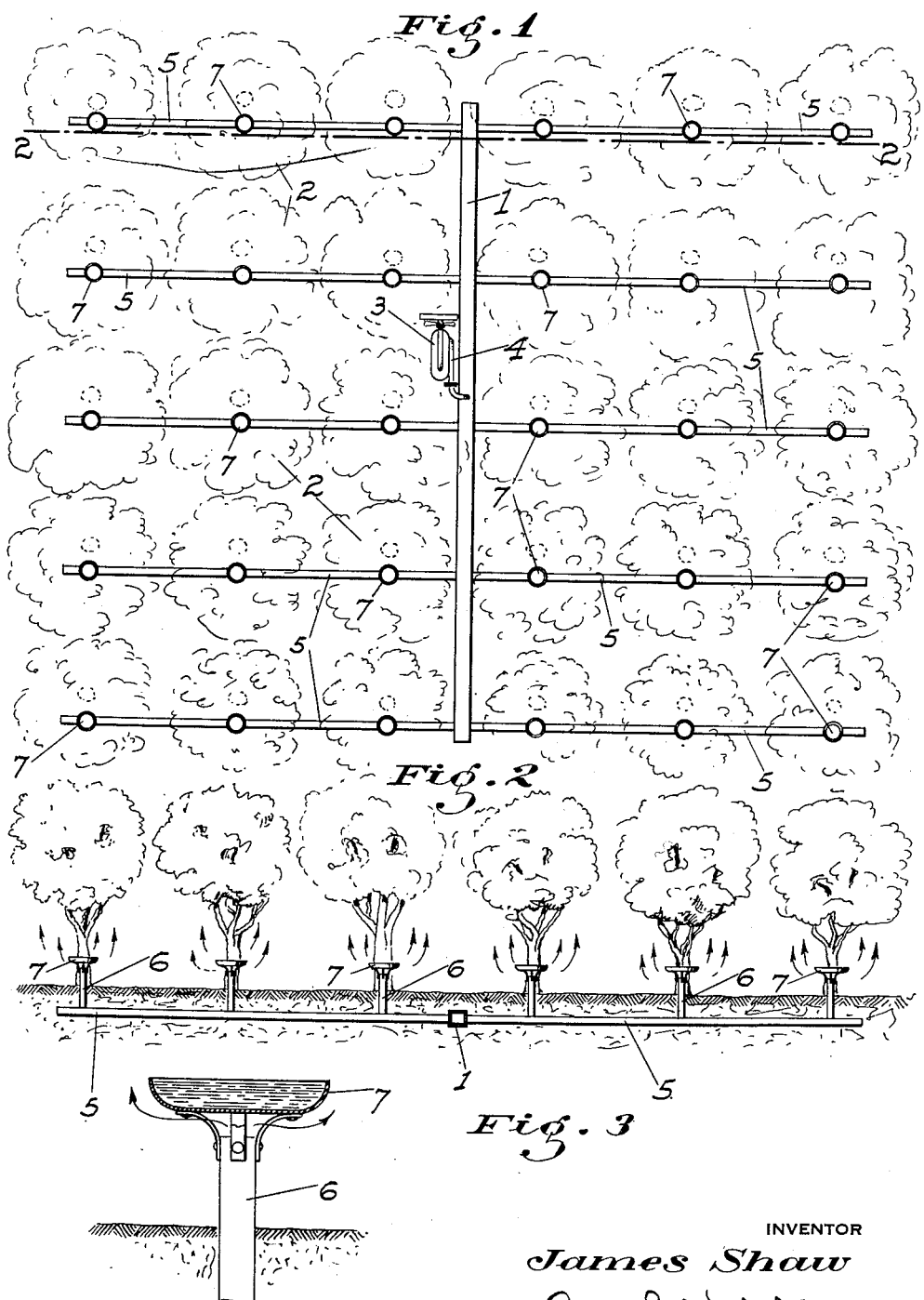

1,619,378

UNITED STATES PATENT OFFICE.

JAMES SHAW, OF SAN FRANCISCO, CALIFORNIA.

SYSTEM OF FROST PREVENTION FOR ORCHARDS.

Application filed February 21, 1925. Serial No. 10,786.

This invention relates to means for preventing damage by frost from occurring in orchards of deciduous fruits and the like.

The principal object of my invention is to provide a system by means of which warm gases may be discharged into the orchard adjacent the ground and individual trees of the orchard, thus dissipating the cold frosty air or preventing the same from forming in the orchard, which air if allowed to settle near the trees causes severe damage to the fruit.

Another object is to provide a system for the purpose arranged in the form of a permanent installation which, however, is so placed that no interference with plowing or cultivating operations is had.

Still another object is to provide for the formation of warm gases without the thick objectionable smoke had in connection with the ordinary smudge pots, and which not only permeates the air of the orchard but ofttimes the surrounding territory as well. This latter feature is not only inconvenient to the inhabitants of the territory but dangerous as well, since it forms fog like banks close to the ground which hampers traffic and is the cause of many accidents.

A further object of the invention is to provide a system which when once installed will be relatively inexpensive to operate and maintain, and which requires no extensive preparations or labor to put into operation when the need arises, such as is the case with the ordinary smudge pot system.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawings similar characters of reference indicate corresponding parts in the several views:

Fig. 1 is a top plan diagonal view of an orchard showing my system installed therein.

Fig. 2 is a sectional elevation on the line 2—2 of Fig. 1.

Fig. 3 is an enlarged sectional elevation of a lateral outlet structure.

Referring now more particularly to the characters of reference on the drawings, the numeral 1 denotes a main conduit of suitable size, closed at both ends and extending lengthwise of the orchard between a row of trees 2. This conduit, although shown in full lines in Fig. 1, is actually buried in the ground a sufficient distance so as not to interfere with plowing or cultivating operations.

Mounted in the orchard close to the conduit 1 is an internal combustion engine 3 of suitable character whose exhaust pipe 4 is connected to and discharges into the conduit 1. As many of these engines may be used to discharge into said conduit at different points in its length as may be rendered necessary by the size of the orchard.

Projecting from and connected to the conduit on both sides thereof are laterals 5 closed at their outer ends. These laterals are also placed under ground to the same depth as the main conduit and extend along the transverse rows of trees or at right angles to the conduit 1. These laterals are placed as close to the trees as is feasible, there being one lateral for each row of trees

Projecting up from the laterals at each tree to a point a short distance above the ground are outlet flues 6, surmounted by enlarged hoods 7 supported thereby and spaced therefrom a suitable distance.

These hoods may if desired be made in the form of bowls to contain a certain amount of water for a purpose hereinafter seen.

While these flues may be all of the same size to enable standardization of parts to be had, the openings from the laterals into the flues preferably increase in size from the main conduit outwardly along the laterals.

In operation therefore when the engine is started exhaust gases from said engine are flowing continuously into the main conduit and thence into the laterals. The pressure of these gases is considerably greater than that of the atmosphere, such pressure being maintained throughout the conduit and laterals by reason of the fact that the openings to the outlet flues are restricted in size relative to the cross sectional area of said conduit and laterals, with respect to the volume of gases being produced.

The volume of gases passing into each flue is practically equalized in all the flues after the system is in operation a short time, by reason of the fact that said outlet openings increase in size from adjacent the main conduit where the pressure is naturally the greatest to the outer ends of the laterals where the pressure is the lowest.

The number of flues and the total combined area of their openings from the laterals relative to the volume of gases produced by the one or more engines used is such that a certain pressure greater than that of the atmosphere is constantly maintained in the system, as above stated.

The bowl-like hoods serve to deflect the flow of hot gases issuing from the flues and cause the same to spread laterally rather than move straight up in small column-like forms. The gases therefore cover practically the entire ground area, while at the same time they will likewise rise as a mass to displace the cold air around the trees and prevent the fruit from being frost bitten.

The water in the hood-bowls is evaporated by reason of the hot gases contacting with said hoods, and also on account of the continuous current thus formed around the bowls. This feature, by keeping the gases moisture laden, helps to hold the heat in the orchard and prevents the rapid dissipation thereof.

The conduit and laterals may be made of any desired material and if found necessary they may be insulated against the radiation of heat therefrom so as to conserve all the heat, some of which would otherwise pass into the ground, where it is not needed.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention what I claim as new and useful and desire to secure by Letters Patent is:

1. In an orchard warming system including flues projecting upwardly from the ground, means for supplying heated gases to the flues at the lower ends thereof, and enlarged hoods surmounting the flues a certain distance above the same.

2. In an orchard warming system including flues projecting upwardly from the ground, means for supplying heated gases to the flues at the lower ends thereof, and enlarged hoods surmounting the flues a certain distance above the same, said hoods being formed as bowls to receive a certain amount of water.

3. In an orchard warming system including flues projecting upwardly from the ground, means for supplying heated gases to the flues at the lower ends thereof, and means whereby as said gases rise from the flues they will become permeated with moisture.

In testimony whereof I affix my signature.

JAMES SHAW.